United States Patent
Alsayyed et al.

(10) Patent No.: US 9,903,614 B2
(45) Date of Patent: Feb. 27, 2018

(54) FLUID DISTRIBUTION SYSTEM FOR OPTIMISING CONSUMPTION OF ENERGY

(71) Applicant: United Arab Emirates University, Al-Ain (AE)

(72) Inventors: Basel Alsayyed, Al-Ain (AE); Emad Elnajjar, Al-Ain (AE); Muthanna Aziz, Al-Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 1263 days.

(21) Appl. No.: 13/919,886

(22) Filed: Jun. 17, 2013

(65) Prior Publication Data
US 2014/0366866 A1 Dec. 18, 2014

(51) Int. Cl.
*F24J 2/46* (2006.01)
*F24D 19/10* (2006.01)
*G05D 23/19* (2006.01)

(52) U.S. Cl.
CPC .......... *F24J 2/46* (2013.01); *F24D 19/1081* (2013.01); *G05D 23/1924* (2013.01); *Y02B 10/20* (2013.01)

(58) Field of Classification Search
CPC ......... F24H 9/2021; F24H 9/2007; F24J 2/46; F24D 19/1081; G05D 23/1924; G05D 23/1306; G05D 23/1858; Y02B 10/20
USPC .................................. 236/20 R, 12.1, 25 R
See application file for complete search history.

(56) References Cited

U.S. PATENT DOCUMENTS

| 4,345,583 A | 8/1982 | Morin |
| 5,388,179 A * | 2/1995 | Boyd, Jr. ............. F24H 9/2014 200/84 B |
| 8,037,931 B2 * | 10/2011 | Penev ................ F24D 17/0021 126/585 |

(Continued)

FOREIGN PATENT DOCUMENTS

| CN | 2132949 Y * | 5/1993 |
| CN | 2539940 Y | 3/2003 |

(Continued)

OTHER PUBLICATIONS

International Search Report and Written Opinion, International Patent Application No. PCT/IB2014/062260, dated Aug. 27, 2014, 10 pages.

*Primary Examiner* — Marc Norman
(74) *Attorney, Agent, or Firm* — Fitch, Even, Tabin & Flannery LLP

(57) ABSTRACT

A fluid distribution system for optimizing consumption of energy is provided comprising: a thermal controller configured to be connected to an external fluid tank containing external fluid having an external fluid temperature adapted to be heated by solar energy, and to an internal fluid tank containing an internal fluid having an internal fluid temperature and a heater adapted to be heated by a non-renewable energy, the thermal controller being configured to be connected to thermostats located at the internal and external tanks for determining the internal fluid temperature and the external fluid temperature; a valve in fluid communication with the internal and external tanks; a fluid controller connected to the thermal controller and to the valve, the fluid controller being configured to operate the valve based on the internal and external fluid temperatures in such a manner to optimize consumption of the non-renewable energy for heating the internal fluid.

4 Claims, 2 Drawing Sheets

(56) References Cited

U.S. PATENT DOCUMENTS

| | | | | |
|---|---|---|---|---|
| 2006/0042470 A1* | 3/2006 | Anson | ............ | A47J 31/46 |
| | | | | 99/275 |
| 2011/0044671 A1* | 2/2011 | Amiran | ............ | F24D 17/0031 |
| | | | | 392/441 |
| 2013/0020310 A1* | 1/2013 | Hacham | ............ | F24H 1/185 |
| | | | | 219/442 |

FOREIGN PATENT DOCUMENTS

| | | |
|---|---|---|
| CN | 1786593 A | 6/2006 |
| DE | 10033669 A1 | 12/2001 |

\* cited by examiner

FLUID DISTRIBUTION SYSTEM FOR OPTIMISING CONSUMPTION OF ENERGY

FIELD OF INVENTION

This invention relates to the field of fluid distribution and energy, and more particularly to a fluid distribution system for optimising consumption of energy.

BACKGROUND OF THE INVENTION

In a big number of countries, the main supply tanks are external, usually located on building/house roofs. These external tanks are generally connected to a cold water distribution line going directly to the user and to a hot water distribution line connected to internal hot water tanks which are heated by means of a non-renewable source of energy such as electricity or gas. Water inside the internal tanks originates from the external tanks. Internal tanks are generally connected to a thermostat and a heating activator controllable by the user for heating the water to a selected temperature according to the user requirements. When the user selects a given heating temperature, the activator activates the heater connected to the internal tanks every time the temperature inside the internal tanks fall below the selected temperature. Since the internal tanks are generally located in an environment with ambient temperature (around 20 degrees Celsius), the temperature inside the internal tanks will get effected by the ambient temperature and will fall under the user pre-selected temperature resulting in an iterative process of activation/deactivation of the heater. This results in huge consumption of energy (electricity/gas).

Besides, in hot countries such as the Gulf countries, the external temperature can be very hot reaching up to 60 degrees Celsius during the day. External tanks are exposed to the sun during the day, and thus cold water originating from external tanks reach the user very hot if not cooled down by cooling systems before it gets to the end user. When cooling systems are used for cooling water, this would result in enormous energy consumption.

In fact, in such hot countries, water stored inside the internal tanks are generally cooler than the water stored in the external tanks. The traditional process of heating the water stored in the internal tanks before distributing it to the hot water distribution line from one side, and distributing the water originating from the external tanks to the cold water distribution line is inefficient and results in enormous energy consumption.

SUMMARY OF THE INVENTION

There is therefore provided a method and system that would overcome the above mentioned drawbacks.

The invention relates to energy management and saving. It calls for maximising use of the solar energy for heating water for daily usage, and for regulating use of hot and cold water originating from external water tanks being heated by means of solar energy (renewable source of energy) and internal water tanks being heated by means of a non-renewable source of energy (such as electricity and gas).

As a first aspect of the invention, there is provided a fluid distribution system for optimising consumption of energy, the system comprising:

a thermal controller configured to be connected to an external fluid tank containing external fluid having an external fluid temperature adapted to be heated by solar energy, and to an internal fluid tank containing an internal fluid having an internal fluid temperature and a heater adapted to be heated by a non-renewable energy, the thermal controller being configured to be connected to thermostats located at the internal and external tanks for determining the internal fluid temperature and the external fluid temperature;

a valve in fluid communication with the internal and external tanks; and a fluid controller connected to the thermal controller and to the valve, the fluid controller being configured to operate the valve based on the internal and external fluid temperatures in such a manner to optimise consumption of the non-renewable energy for heating the internal fluid.

The system preferably further comprises a user interface connected to the thermal controller adapted to enable a user to indicate a desired fluid temperature for use.

Preferably, the fluid controller controls the valve for regulating the flow of fluid from the internal and external fluid tanks as a function of the indication of the user and of the internal and external fluid temperatures in such a manner to optimise consumption of the non-renewable energy for heating the internal fluid tank.

Preferably, the user is enabled to select whether a hot fluid or a cold fluid is desired.

When the user selection is to use hot water, the fluid controller and the valve enable flow of fluid to the user from the external fluid tank if the external fluid temperature is higher than the internal fluid temperature, and to enable flow of fluid to the user from the internal fluid tank if otherwise.

Preferably, the system further comprises a fluid volume meter for determining the volume of the internal fluid inside the internal fluid tank.

Preferably, the system further comprises a calculator connected to the thermal controller, to the user interface and to the fluid volume meter, the calculator is configured to determine an optimal volume of the external fluid for mixing with the internal fluid as a function of first criteria comprising the internal and external fluid temperatures, the user desired fluid temperature, and the volume of the internal fluid inside the internal fluid tank in such a manner to optimise consumption of the non-renewable energy for heating the internal fluid.

Preferably, the calculator is connected to the fluid controller for controlling the valve for enabling flow of the determined optimal volume of external fluid inside the internal tank for mixing with the internal fluid and obtaining a mixed fluid having a mixed fluid temperature.

The mixed fluid temperature can be substantially equal to the user desired temperature.

When the mixed fluid temperature is lower than the user desired temperature, preferably, the thermal controller activates the heater for heating the mixed fluid up to the user desired temperature.

The system preferably further comprises a buffer tank in fluid communication with the external and internal tanks and the valve.

Preferably, the user interface is further adapted to enable the user to indicate a time frame for obtaining a fluid with the desired temperature available for use.

Preferably, the calculator is configured to determine the optimal volume of fluid to obtain from the external fluid tank and the optimal volume of fluid to obtain from the internal tank for mixing and the amount of time required for heating the mixed fluid as a function of second criteria comprising the internal and external fluid temperatures, the user desired temperature and time frame specified by the user for obtaining the mixed fluid with the desired temperature available for use.

Preferably, the calculator further determines whether it is beneficial to use the buffer tank to mix the internal and external fluids and heat up the mixed fluid obtained rather than using the internal tank, wherein the determination is made as a function of the second criteria in addition to the volume of the internal fluid and the volume capacity of the internal tank.

Preferably, the system further comprises a solar thermal system in thermal communication with the external tank for heating the external fluid.

Preferably, the fluid is water.

Further advantages of the invention will become apparent from the drawings and the following description.

BRIEF DESCRIPTION OF THE DRAWINGS

The invention will now be described by way of example only, with reference to the accompanying drawings, in which.

DETAILED DESCRIPTION OF THE INVENTION

Figure 1:
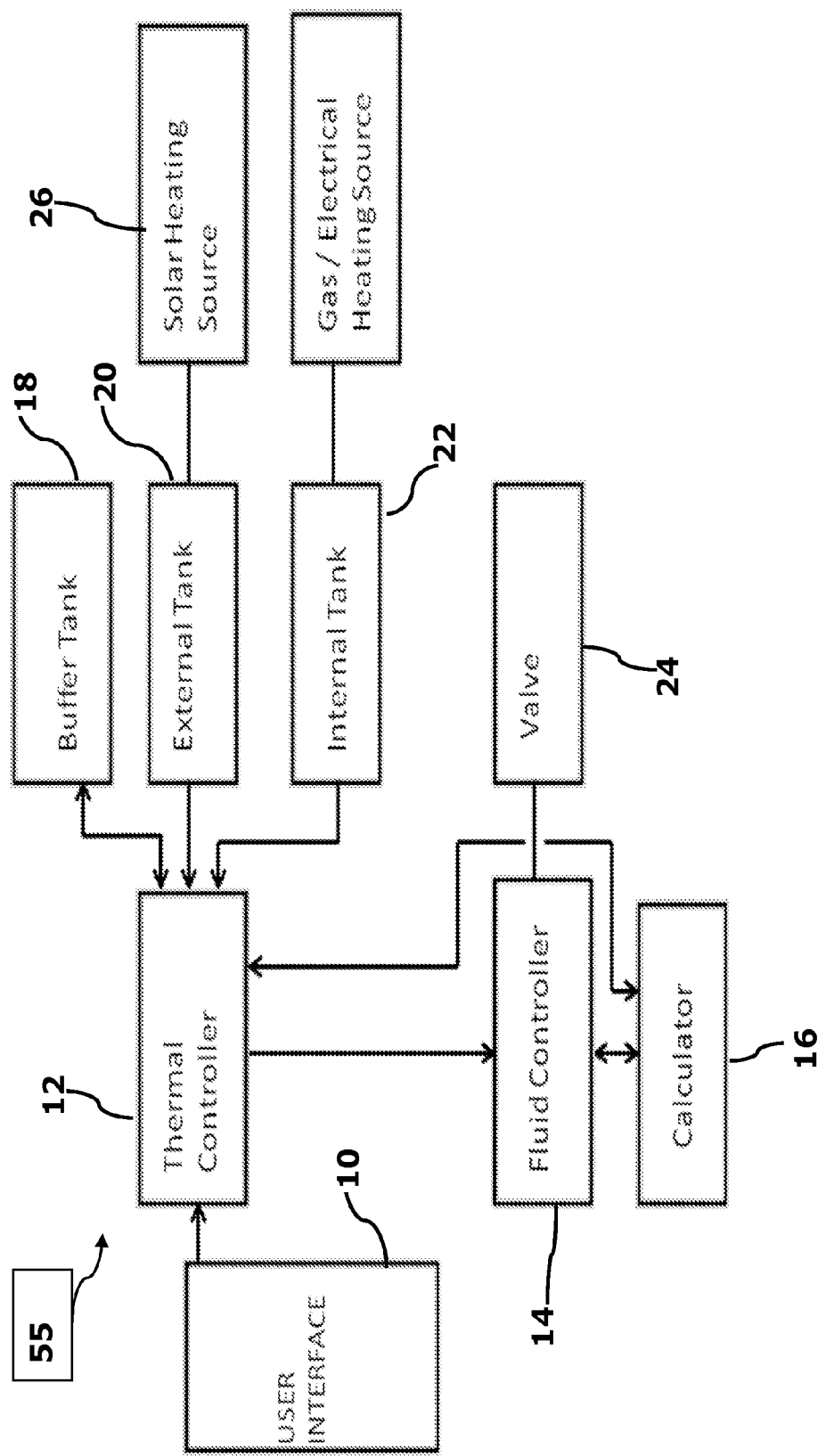
FIG. 1 is a bloc diagram illustrating the components of the distribution system in accordance with one embodiment of this invention.
Figure 2:
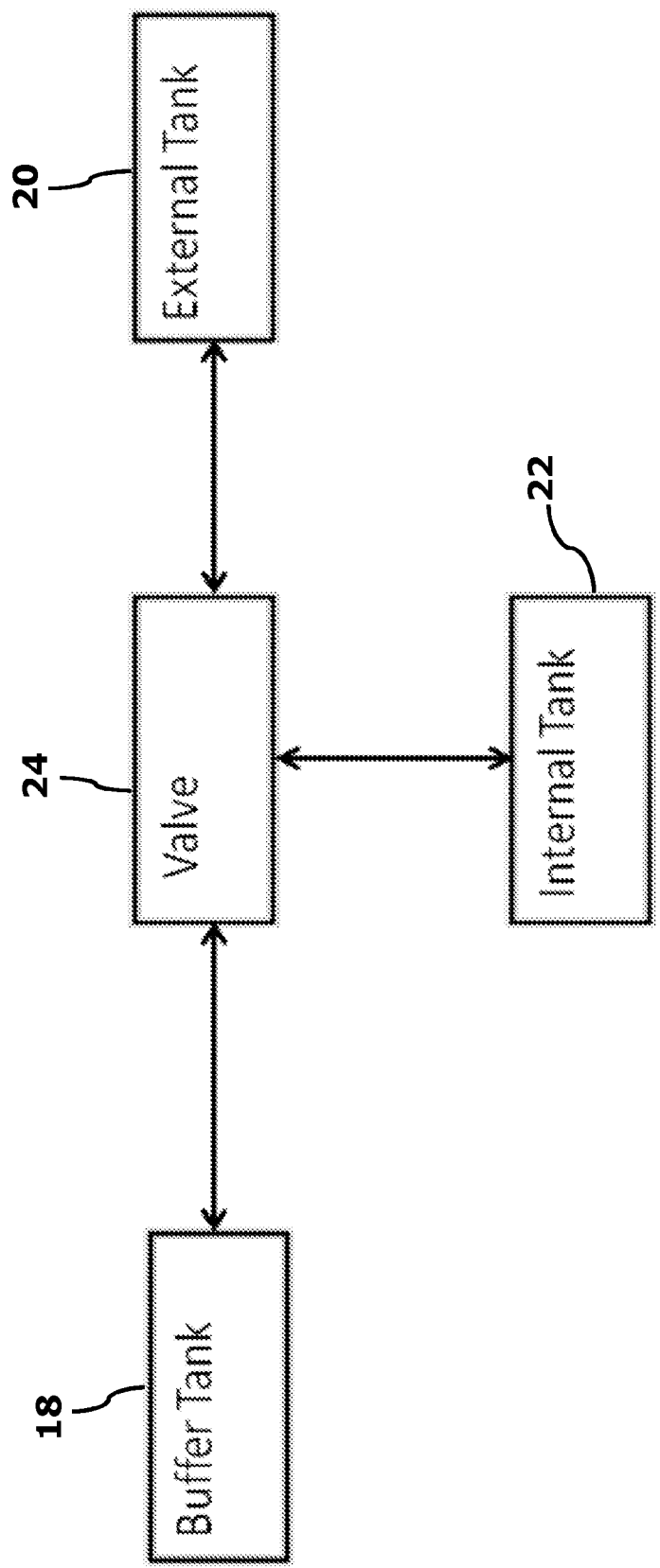
FIG. 2 is a bloc diagram showing the pipe line connections of the valve in accordance with one embodiment of this invention.

There is provided a system 55 for controlling distribution of cold and hot water from an internal tank 22 and an external tank 20, the system 55 comprising a user interface 10, a thermal controller 12, a fluid controller 14 and a valve 24. The system 55 can also comprise a microprocessor (not shown) and a buffer tank 18.

The thermal controller 12 is connected to the internal tank 22 and to the external tank 20 for determining the temperature of the water contained in these tanks thermostats located at these tanks. The thermal controller 12 is also connected to the user interface 10. The user interface 10 is configured to enable the user to specify the desired temperature of water (user selected temperature). The thermal controller 12 is configured to determine the temperature selected by the user using the user interface 10.

The fluid controller 14 is connected to the thermal controller 12 and to the valve 24. The fluid controller 14 reads the external and internal temperatures as well as the user selected temperature from the thermal controller 12 and controls the valve operations as a function thereof. The valve 24 is connected to the water distribution lines of the external 20 and internal tanks 22 and is configured to control the flow of water originating from these tanks.

The system 55 is configured to determine the most convenient source of water (external 20 or internal 22 tanks) from which to obtain the water based on the user selected temperature and the water temperatures inside of the internal 22 and external 20 tanks respectively. This determination is based on energy efficiency. In its basic form, if the user desires cold water, the fluid controller 14 will send a signal to the valve 24 for enabling flow of water from the internal tank 22 in case where the temperature inside the internal tank 22 is lower than the temperature of the water inside the external tank 20. If the user desires hot water, the fluid controller 14 will send a signal to the valve 24 for enabling flow of water from the external tank 20 in case where the temperature of the water inside the external tank 20 is higher than the temperature of the water inside the internal tank 22.

It might also be convenient to mix water from the internal 22 and external 20 tanks for obtaining the user desired temperature of water. In this case, it is important to determine the required amount of water to obtain from the external tank 20 for mixing with the water located inside the internal tank 22. The optimal volume of water to obtain from the external tank 20 will depend on the user selected temperature, the temperature of the water inside the external tank 20, and the volume and temperature of water inside the internal tank 22.

Therefore, the system 55 further comprises a calculator 16 for determining the required volume of water to obtain. The calculator 16 can comprise any means configurable to conduct mathematical calculations based on desired functions such as electronic circuit and/or a microprocessor and/or any other electronic components.

The system 55 also further comprises a water volume meter (not shown) that can comprise a water level meter, an ultrasonic sensor or any other sensing means for determining the volume of water inside the internal tank 22. In this case, the calculator 16 and the water volume meter are connected to the fluid controller 14.

For example, if the internal tank 22 contains 20 gallons of water at 20 degrees Celsius and the user selected temperature is 30 degrees Celsius, the fluid controller 14 impels the valve 24 to open for directing the required volume of water from the external tank 20 into the internal tank 22 for bringing the overall temperature of the water inside the internal tank 22 to 30 degrees Celsius. If the temperature of the water inside the external tank 20 is 40 degrees Celsius, the valve 24 will allow directing 20 gallons of water at 40 degrees Celsius inside the internal tank 22 for bringing the temperature of water inside the internal tank 22 to 30 degrees Celsius.

The thermal controller 12 is also configured to activate the heater of the internal tank 22 in case where it is impossible to bring the water inside the internal tank 22 to the user selected temperature by purely mixing it with water originating from the external tank 20. This is for example if the internal tank 22 contains 20 gallons of water at 20 degrees Celsius, the temperature of the water inside the external tank 20 is 40 degrees Celsius and the user selected temperature is 50 degrees Celsius. In this case, the fluid controller 14 can be configured to obtain the largest amount of water possible from the external tank 20 (based on the volume capacity of the internal tank 22) for mixing it with the water inside the internal tank 22 in order to increase its temperature, and the thermal controller 12 will activate the heater to heat the water for the difference of temperature still required to bring the overall temperature of the water to the one selected by the user.

Since the amount of energy required for heating the water increases with the volume of the water, it might be more energy efficient to heat the water inside the internal tank 22 without obtaining water from the external tank 20 if the amount of water inside the internal tank 22 is sufficient for the user. In this optic, the user interface 10 is also configured to enable the user to specify the volume of water required for use and the time frame required for obtaining the water with the user selected temperature ready for use.

The calculator 16 and the fluid controller 14 are configured to use these attributes to determine how best to proceed for obtaining the desired volume of water to the desired selected temperature within the desired time frame. This calculation is based on mathematical calculations based on thermodynamic principles.

In one embodiment, the system 55 further comprises a buffer tank 18 connected to the internal 22 and external 20 tanks for preparing the required volume of water requested by the user at the selected temperature within the desired time frame. The buffer tank 18 can be used to mix water originating from the internal 22 and external 20 tanks. This will be advantageous for example in case where the volume of water inside the internal tank 22 is too large for the user's need, and it is more energy efficient to obtain from the tank and mix with the water originating from the external tank 20 a limited volume of water. This is because the energy required to heat water increases with the water volume.

The measuring means determine the optimal volume of water to obtain from the external tank 20, as well as the optimal volume of water to obtain from the internal tank 22 based on the temperature of the water inside the internal 22 and external 20 tanks, the user desired temperature and the volume of water required by the user for use. This determination by the measuring means is sent to the fluid controller 14 for controlling the valve 24 accordingly. The valve 24 controls the water flows from both the external 20 and internal 22 tanks as determined by the measuring means and enables flow of the water from these sources to the buffer tank 18 for mixing. If the temperature of the mixed water is still below the user selected temperature, the thermal controller 12 activates the heater for heating the mixed water for bringing it to the desired temperature. This also is determined in advance by the measuring means and communicated to the thermal controller 12.

It should be understood that the system 55 may comprise multiple valves, depending on the water line network. Multiple buffer tanks can also be used. The system 55 may also comprise a solar thermal system 26 connected to the external tank 20 for heating the water inside the external tank 20. It should also be understood that the fluid can be any type of fluid, and not only limited to water.

Although, the figures, rates, flows, dimensions and other numbers presented hereinabove and/or in the drawings have been used to prove the concept of the invention, they apply for the experimental set-up only and should not be construed for limiting the scope of the invention. They can be scaled up for commercial scale processing without departing from the scope of the present invention.

Although the above description contains many specificities, these should not be construed as limitations on the scope of the invention but is merely representative of the presently preferred embodiments of this invention. The embodiment(s) of the invention described above is(are) intended to be exemplary only. The scope of the invention is therefore intended to be limited solely by the scope of the appended claims.

The invention claimed is:

1. A fluid distribution system for optimising consumption of energy, the system comprising:
    a thermal controller configured to be connected to an external fluid tank containing an external fluid having an external fluid temperature adapted to be heated by solar energy, and to an internal fluid tank containing an internal fluid having an internal fluid temperature and a heater adapted to be heated by a non-renewable energy, the thermal controller being configured to be connected to thermostats located at the internal and external tanks for determining the internal fluid temperature and the external fluid temperature;
    a valve in fluid communication with the internal and external tanks;
    a fluid controller connected to the thermal controller and to the valve, the fluid controller being configured to operate the valve based on the internal and external fluid temperatures in such a manner to optimise consumption of the non-renewable energy for heating the internal fluid;
    a user interface connected to the thermal controller adapted to enable a user to indicate a desired fluid temperature for use and a time frame for obtaining a fluid with the desired temperature available for use;
    a fluid volume meter for determining a volume of the internal fluid inside the internal fluid tank; and
    a calculator connected to the thermal controller, to the user interface and to the fluid volume meter, wherein the calculator is configured to determine an optimal volume of the external fluid for mixing with the internal fluid as a function of first criteria comprising the internal and external fluid temperatures, the user desired fluid temperature, and the volume of the internal fluid inside the internal fluid tank in such a manner to optimize consumption of the non-renewable energy for heating the internal fluid;
    wherein the calculator is connected to the fluid controller for controlling the valve for enabling flow of the determined optimal volume of external fluid inside the internal tank for mixing with the internal fluid and obtaining a mixed fluid having a mixed fluid temperature; and
    wherein the calculator is configured to determine the optimal volume of fluid to obtain from the external fluid tank and the optimal volume of fluid to obtain from the internal tank for mixing and an amount of time required for heating the mixed fluid as a function of second criteria comprising the internal and external fluid temperatures, the user desired temperature and time frame specified by the user for obtaining the mixed fluid with the desired temperature available for use.

2. The system as claimed in claim 1, further comprising a buffer tank in fluid communication with the external and internal tanks and the valve and wherein the calculator further determines whether it is beneficial to use the buffer tank to mix the internal and external fluids and heat up the mixed fluid obtained rather than using the internal tank, wherein the determination is made as a function of the second criteria in addition to the volume of the internal fluid and a volume capacity of the internal tank.

3. The system as claimed in claim 1, further comprising a solar thermal system in thermal communication with the external tank for heating the external fluid.

4. The system as claimed in claim 1, wherein the internal fluid and the external fluid is water.

* * * * *